US005592635A

United States Patent [19]
Chan

[11] Patent Number: 5,592,635
[45] Date of Patent: Jan. 7, 1997

[54] TECHNIQUE FOR ACCELERATING INSTRUCTION DECODING OF INSTRUCTION SETS WITH VARIABLE LENGTH OPCODES IN A PIPELINE MICROPROCESSOR

[75] Inventor: Stephen H. Chan, Sunnyvale, Calif.

[73] Assignee: Zilog, Inc., Campbell, Calif.

[21] Appl. No.: 276,060

[22] Filed: Jul. 15, 1994

Related U.S. Application Data

[63] Continuation of Ser. No. 858,178, Mar. 25, 1992, abandoned.

[51] Int. Cl.$^6$ ............................................. G06F 9/30
[52] U.S. Cl. ............................................. 395/386; 395/389
[58] Field of Search ................................. 395/375, 800

[56] References Cited

U.S. PATENT DOCUMENTS

| | | | |
|---|---|---|---|
| 3,656,123 | 4/1972 | Carnvale et al. | 395/550 |
| 3,657,705 | 4/1972 | Mekota et al. | |
| 3,771,138 | 11/1973 | Celtruda et al. | |
| 4,236,206 | 11/1980 | Strecker et al. | 395/375 |
| 4,325,118 | 4/1982 | DeVita et al. | 395/375 |
| 4,346,437 | 8/1982 | Blahut et al. | |
| 4,363,091 | 12/1982 | Pohlman, III et al. | 395/400 |
| 4,454,578 | 6/1984 | Matsumoto | 395/375 |
| 4,502,111 | 2/1985 | Riffle et al. | 395/775 |
| 4,890,218 | 12/1989 | Bram | 395/375 |
| 5,057,837 | 10/1991 | Colwell et al. | 395/375 |
| 5,113,515 | 5/1992 | Fite et al. | |
| 5,117,488 | 5/1992 | Noguchi et al. | 395/375 |

FOREIGN PATENT DOCUMENTS

| | | |
|---|---|---|
| 0415366 | 3/1991 | European Pat. Off. |
| WO9003001 | 3/1990 | WIPO |

OTHER PUBLICATIONS

Lindauer et al., Instruction Unit, IBM Technical Disclosure Bulletin, vol. 7, No. 1, Jun. 1964.

*Primary Examiner*—Jack B. Harvey
*Assistant Examiner*—David A. Wiley
*Attorney, Agent, or Firm*—Majestic, Parsons, Siebert & Hsue

[57] ABSTRACT

In a computer where instructions are fetched in segments and where segments of an instruction are assembled before execution is initiated, processing of instructions is accelerated by examining segments of the instructions concurrently while they are being fetched. The information obtained from such examination is then used to shorten the decoding step for the instruction.

31 Claims, 5 Drawing Sheets

TECHNIQUE FOR ACCELERATING INSTRUCTION DECODING OF INSTRUCTION SETS WITH VARIABLE LENGTH OPCODES IN A PIPELINE MICROPROCESSOR

This is a continuation of application Ser. No. 858,178, filed Mar. 25, 1992 now abandon.

TECHNICAL FIELD

The present invention relates in general to improving the throughput of a computer and in particular to a scheme of decoding instructions whereby processing of instructions in a central processing unit (CPU) is accelerated.

BACKGROUND OF THE INVENTION

The pipeline architecture has been used in the designs of many of today's computers. The architecture resembles an assembly line. It partitions the execution sequence of instructions into a sequence of tasks (e.g. fetching instructions, decoding instructions, execution, storing results). To each of these tasks is provided a dedicated station of resources. As instructions flow through the pipeline, their tasks will be serviced by the stations successively. Each instruction is followed by its next sequential instruction which will occupy, as soon as possible, the stations which it vacates. The time delay between the initiation of different instructions and the completion thereof under the pipeline architecture is therefore compacted, and throughput of the computer is increased.

An inefficient station in a pipeline computer would create a bottleneck. A bottleneck station dictates the throughput of the computer because it dictates the flow speed of instructions. If a bottleneck station can be accelerated, throughput of a pipeline computer will be increased.

A common bottleneck in pipeline computers is the decoding of instructions with opcodes of non-uniform lengths.

Computer instructions normally have an opcode from which signals for directing the processing of a corresponding instruction are generated. The size of the opcode for a computer usually depends on the width of its data path, which in turn depends on its hardware (arithmetic-logic unit, buses, decoder, etc.). If the opcode is n bit long, it can be decoded into $2^n$ different bit combinations, and the computer would have a set of $2^n$ different types of instructions. Typically in most of today's computer designs, n is an integer multiple of eight (i.e. a byte).

There are occasions, however, where the instruction set of a computer needs to be expanded without a corresponding expansion of its data path. One such occasion arises when a computer must be upgraded to provide more instructions without having to make substantial changes to its hardware. When such occasions arise, one or more bytes would commonly be added to the opcode.

In prior art computers, decoding of a multi-byte opcode is performed by examining each byte one at a time when the instruction is decoded. The examination of each byte would take one cycle. A disadvantage in this prior art approach is that decoding a multi-byte opcode would now take multiple cycles, creating a bottleneck in the pipeline and decreasing the throughput.

SUMMARY OF THE INVENTION

The lengths of instructions for many of today's computers., especially CISC (Complex Instruction Set Computing) computers, are at least equal to and often greater than the widths of the computers' data paths. Instructions in these computers are often fetched in segments. Execution of an instruction would begin only when all its segments have been fetched and assembled.

This invention makes use of the time when segments of an instruction are being fetched and assembled. During this time, partial decoding of the instruction is performed. The information obtained from the partial decoding is then used to accelerate the subsequent processing of the instruction.

The present invention is directed to a central processing unit which comprises means for fetching instructions (such as, for example, an instruction prefetch unit), means for decoding instructions fetched by the fetching means (such as, for example, an instruction decoder), and means for executing instructions decoded by the decoding means (such as, for example, execution logic). The central processing unit (CPU) is also provided with means for examining, concurrently during the fetching of an instruction by the fetching means, a subset of bits in the instruction. The examining means includes means for generating at least one signal to accelerate the processing of an instruction based upon the subset of bits examined.

DESCRIPTION OF THE PREFERRED EMBODIMENT

Figure 1:
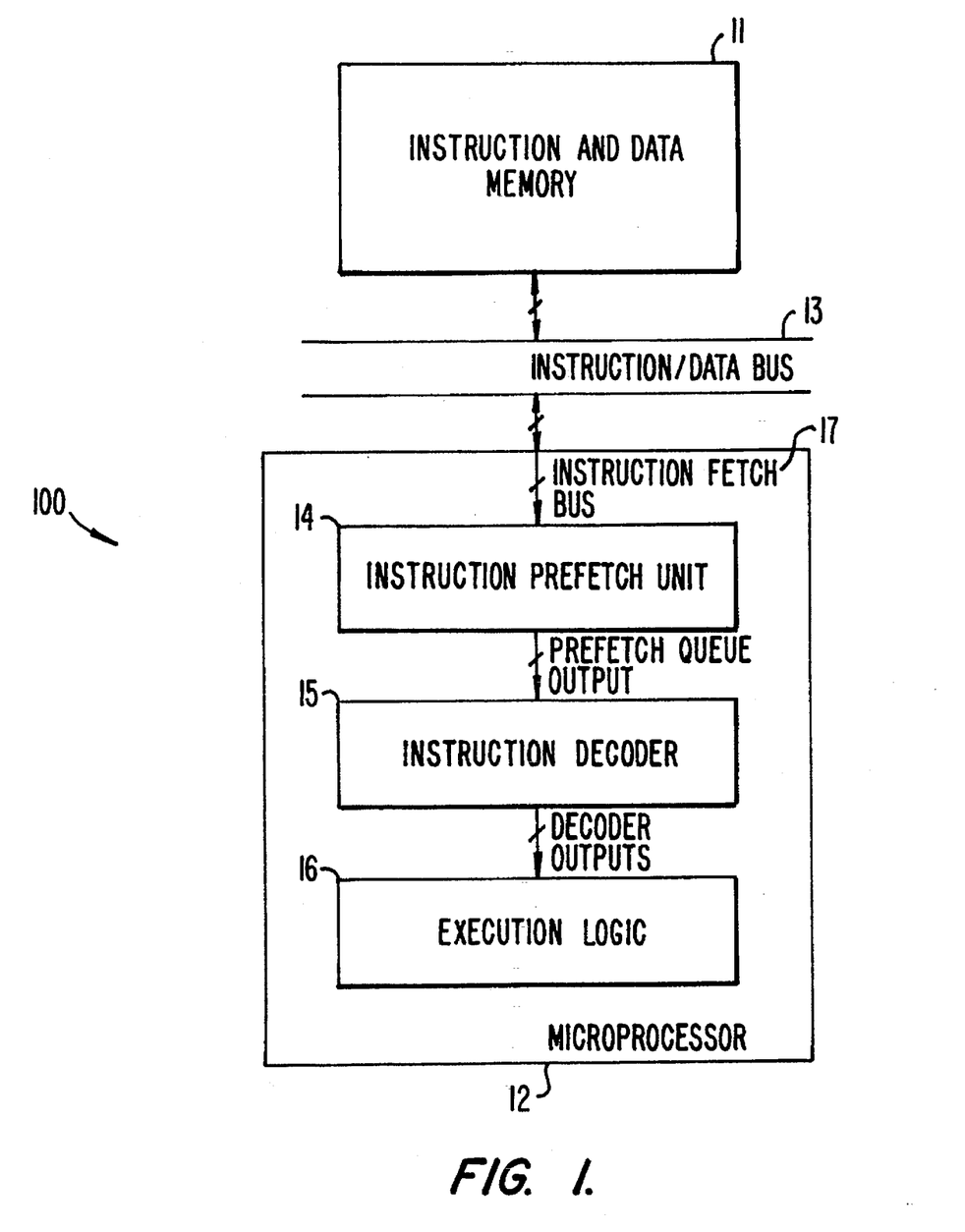
FIG. 1 is a schematic block diagram of a computer system in which the present invention is embodied.

FIG. 1 is a schematic block diagram of a computer system 100 in which the present invention is embodied. The computer system 100 comprises a memory 11 in which instructions and data are stored. It also comprises a microprocessor (CPU) 12 which fetches instructions and data from the memory 11. The instructions and data are fetched via a 2-byte wide bus 13. They are then processed by CPU 12. Any data generated as a result of the processing are stored, if needed, back into the memory 11 through the bus 13.

Because memory and bus designs are commonly available in the art, description of the bus 13 and the memory 11 is deemed unnecessary.

Each instruction of the computer system 100 has an opcode. Some instructions also have in addition to the opcode, one or more constant fields specifying operands or addresses of operands of the instructions. The opcode of an instruction for the computer system 100 can be either one-byte, two-byte, or three-byte long. However, if an opcode is two-byte long, the first byte would be an "escape code". An escape code is a byte that has a hexadecimal value of either "ED" "DD" "FD" or "CB". It is used to notify the CPU 12 that the corresponding opcode is expanded to more than one byte long. (While only the four specific hexadecimal numbers are designated above as Escape Codes, it will be understood that other hexadecimal values can also be used.) When the opcode of an instruction has an escape code, the opcode would have at least two bytes.

Similarly, if an opcode is three-byte long, each of the first two bytes would be an escape code. Even though the two Escape Codes can be combined in sixteen different ways (as each escape code can have four different values), only the following six combinations are used in the preferred embodiment: ED-CB, DD-CB, FD-CB, ED-ED, ED-DD and ED-FD. The reason for using only these six combinations is because other combinations, while the use thereof is not limited under the invention, are not presently needed, they are reserved for possible future expansion of the instruction set.

The opcode can similarly be expanded further to m bytes. Each of the first m-1 bytes of such an opcode would, however, be an escape code.

Instructions are fetched by the CPU 12 under the control of an Instruction Prefetch Unit 14. Depending upon the state of the Instruction Prefetch Unit 14 (including the fullness of a Prefetch Queue which will be described hereinafter with reference to FIG. 2), instructions are fetched in either one-byte or in two-byte segments.

When each byte of instruction arrives at the CPU 12, it is received by the Instruction Prefetch Unit 14 via an internal Instruction Fetch Bus 17. Each byte of instruction is then assembled in the Prefetch Queue.

The execution of an instruction begins when it is retrieved from the Prefetch Queue and its opcode is sent to an Instruction Decoder 15. The Instruction Decoder 15 is one-byte wide. It decodes an one-byte opcode in one CPU cycle. Without the present invention, decoding a two-byte opcode would take the Instruction Decoder 15 two CPU cycles, and decoding a three-byte opcode would take three CPU cycles.

The Instruction Decoder 15 decodes the opcode of an instruction to generate control signals to an Execution Logic 16. Operands, if any, specified in the instruction will be sent directly to the Execution Logic 16, bypassing the Instruction Decoder 15. The Execution Logic 16 performs logic and arithmetic operations specified by the opcode in response to the signals from the Instruction Decoder 15.

Because designs of decoders and execution logic are available in the art, detailed description of the Instruction Decoder 15 and the Execution Logic 16 is deemed unnecessary.

Figure 2:
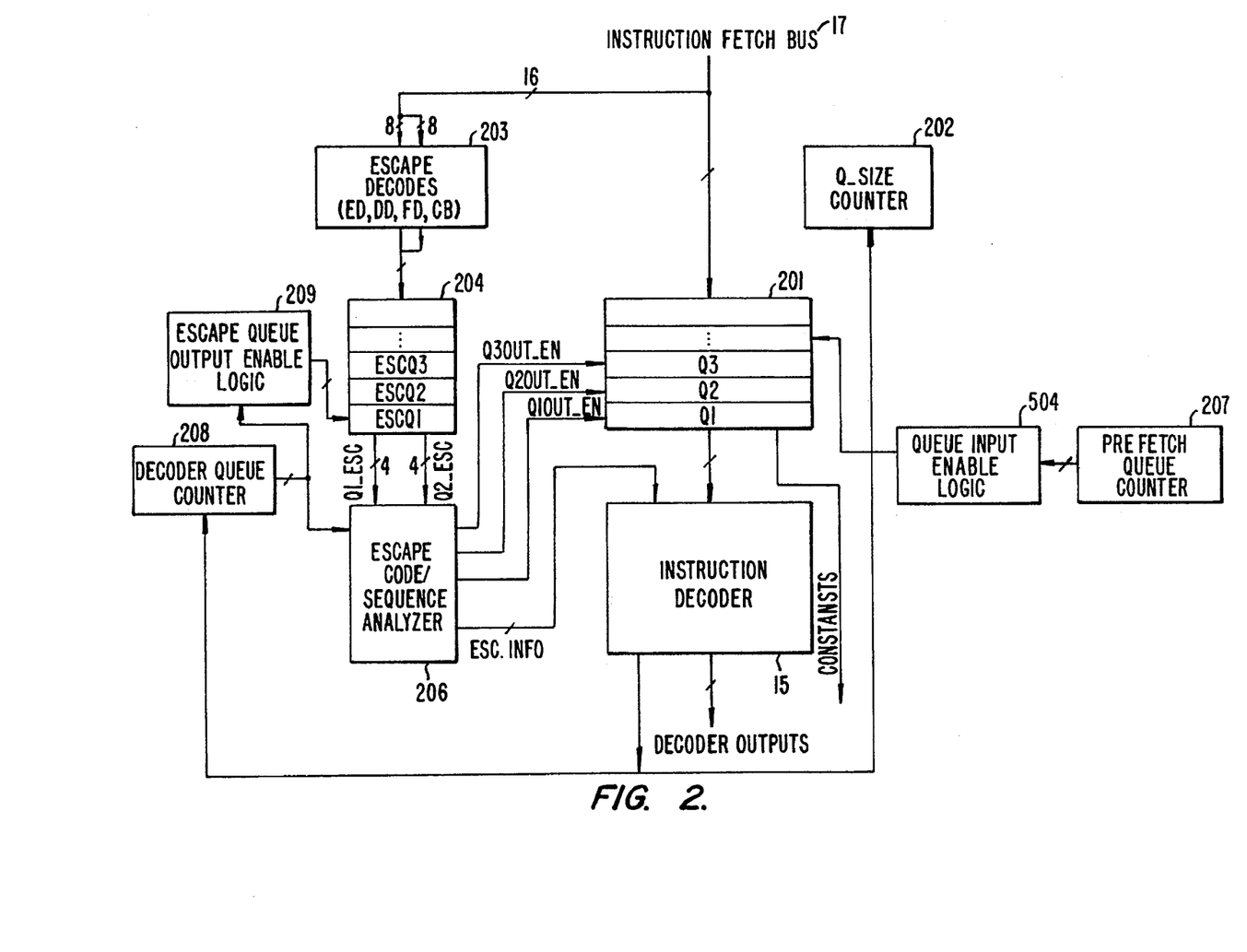
FIG. 2 is a schematic block diagram illustrating how instructions are examined as they are fetched.

With reference to FIG. 2, there is shown a schematic block diagram illustrating how instructions are examined as they are fetched.

As bytes of instructions arrive from the memory 11 to the CPU 12, they are saved in an 8-bit wide Prefetch Queue 201., which is implemented with a circular buffer. The Prefetch Queue 201 has a depth of eight entries. A Prefetch Queue Counter 207 is provided for identifying the first vacant entry of the Prefetch Queue 201.

Output from the Prefetch Queue Counter 207 is applied to a Queue Input Enable Logic 504 which controls the storing of instruction bytes into the Prefetch Queue 201. When two bytes of instruction are fetched, the first byte will arrive at the high order byte and the second byte will arrive at the low order byte of the Instruction Fetch Bus 17. When only one byte of instruction is fetched, it will arrive at the high order byte of the Instruction Fetch Bus 17. The Queue Input Enable Logic 17 stores each arriving byte into the first vacant entry of the Prefetch Queue 201. When a byte of instruction is stored, the Prefetch Queue counter 207 will be updated accordingly.

A Q-size Counter 202 is provided to record the number of bytes stored in the Prefetch Queue 201. When a byte of instruction is stored into the Prefetch Queue 201, the Q-size Counter 202 will be incremented by one. Conversely, when an instruction is retrieved from the Prefetch Queue 201 for processing by the Instruction Decoder 15, the Q-size Counter 202 will be decremented by the number of bytes of that instruction.

The Instruction Fetch Bus 17 is also connected to an Escape Decoder 203. The Escape Decoder 203 comprises a high order 1-byte wide decoder 203a which is connected to the high order byte of the Instruction Fetch Bus 17 and a low order 1-byte wide decoder 203b which is connected to the low order byte of the Instruction Fetch Bus 17. As each byte of instruction is fetched by the CPU 12, it is concurrently received by either the high order decoder 203a or the low order decoder 203b. Each of the decoders 203a, 203b operates to examine whether an incoming byte of instruction is an escape code.

Each of the high and low Escape Decoders 203a, 203b outputs four bits. When an Escape Decoder 203 encounters an escape code, a particular one of the four output bits will be set depending upon the value of the escape code. For example, if the incoming byte of instruction is equal to "ED", the first output bit will be set, if the incoming byte is equal to "DD", the second output bit will be set, if the incoming byte is equal to "FD", the third output bit will be set and if the incoming byte is equal to "CB", the fourth bit will be set.

The 4-bit outputs of the Escape Decoders 203 are stored in a 4-bit wide Escape Queue 204, which is implemented with a circular buffer. The Escape Queue 204 has a depth of eight entries, same as the number of entries in the Prefetch Queue 201. Each entry of the Prefetch Queue 201 has a counterpart entry in the Escape Queue 204. When bytes are stored in and retrieved from the Prefetch Queue 201, corresponding entries in the Escape Queue 204 will be added and deleted. The Prefetch Queue counter 207, which points to the first vacant entry in the Prefetch Queue 201, also points to its counterpart entry in the Escape Queue 204.

A three-bit Decoder Queue Counter 208 is provided for pointing to the entry in the Prefetch Queue 201 that contains the first byte of the next sequential instruction to be decoded and executed. The Decoder Queue Counter 208 also points to the counterpart entry in the Escape Queue 204.

since the Escape Queue 204 receives input from the Escape Decoders 203a, 203b, each entry in the Escape Queue 204 therefore contains information on whether the instruction byte in the counterpart entry of the Prefetch Queue 201 is an escape code. The Escape Queue outputs a 4-bit Q1-Esc output and a 4-bit Q2-Esc output. When the first byte in the next sequential instruction (as pointed to by the Decoder Queue Counter 208) is an escape code, a bit in the Q1-Esc output, depending upon the value of the escape code, will be set. When the second byte in the next sequential instruction is an escape code, a bit in the Q2-Esc output, depending also on the value of the escape code, will be set.

The Q1-Esc output and the Q2-Esc output from the Escape Queue 204 are coupled to an Escape Code/Sequence Analyzer 206. The Escape Code/Sequence Analyzer 206 uses the Q1-Esc and the Q2-Esc signals to set one of its three outputs: Q1out-En, Q2out-En and Q3out-En. These three signals are used to enable one of the first three bytes in the next sequential instruction into the Instruction Decoder 15. If the next sequential instruction has a 1-byte opcode, Q1out-En will be set to enable the first byte of the next sequential instruction to the Instruction Decoder 15. If the next sequential instruction has a 2-byte opcode, Q2out-En will be set to enable the second byte to the Instruction Decoder 15. And if the next sequential instruction has a 3-byte opcode, Q3out-En will be set to enable the third byte to the Instruction Decoder 15.

An Esc-Info signal is output from the Escape Code/ Sequence Analyzer 206 to the Instruction Decoder 15. This signal provides the Instruction Decoder 15 with other information obtained from analyzing an escape code or an opcode.

By sending the proper byte to the Instruction Decoder 15, and skipping over the escape codes, the next sequential instruction can therefore be decoded in one cycle even when the opcode has more than one byte. As a result, processing of the corresponding instruction is accelerated.

The operation of the Escape Code/Sequence Analyzer 206 is now described with reference the FIG. 3 and the following Table 1.

TABLE 1

| Condition | Q1-Esc | Q2-Esc |
| --- | --- | --- |
| No Escape | not ED,DD,FD or CB | Don't Care |
| Escape Code | ED | Not ED,DD,FD or CB |
|  | DD or FD | not CB |
|  | CB | Don't Care |
| Escape Sequence | ED | ED,DD,FD or CB |
|  | DD or FD | CB |

With reference to the first row of Table 1, the "No Escape" condition means that none of the bits in Q1-Esc is set because the instruction has an 1-byte opcode. The value of Q2-Esc is irrelevant (Don't Care).

In the second row of Table 1, the "Escape Code" condition means either (1) the ED bit of Q1-Esc is set and none of the bits in Q2-ESC is set; (2) either the DD bit or the FD bit in the Q1-Esc is set; but the CB bit in Q2-Esc is not set; or (3) the CB bit in Q1-Esc is set. This condition means that the opcode of the next sequential instruction has only one escape code.

In the third row of Table 1, the "Escape Sequence" condition means either (1) the ED bit in Q1-Esc is set and any one of the four bits in Q2-Esc is set; or (2) either the DD bit or the FD bit of Q1-Esc is set; and the CB bit in Q2-Esc is set. This condition means that the opcode is a valid 3-byte opcode.

Figure 3:
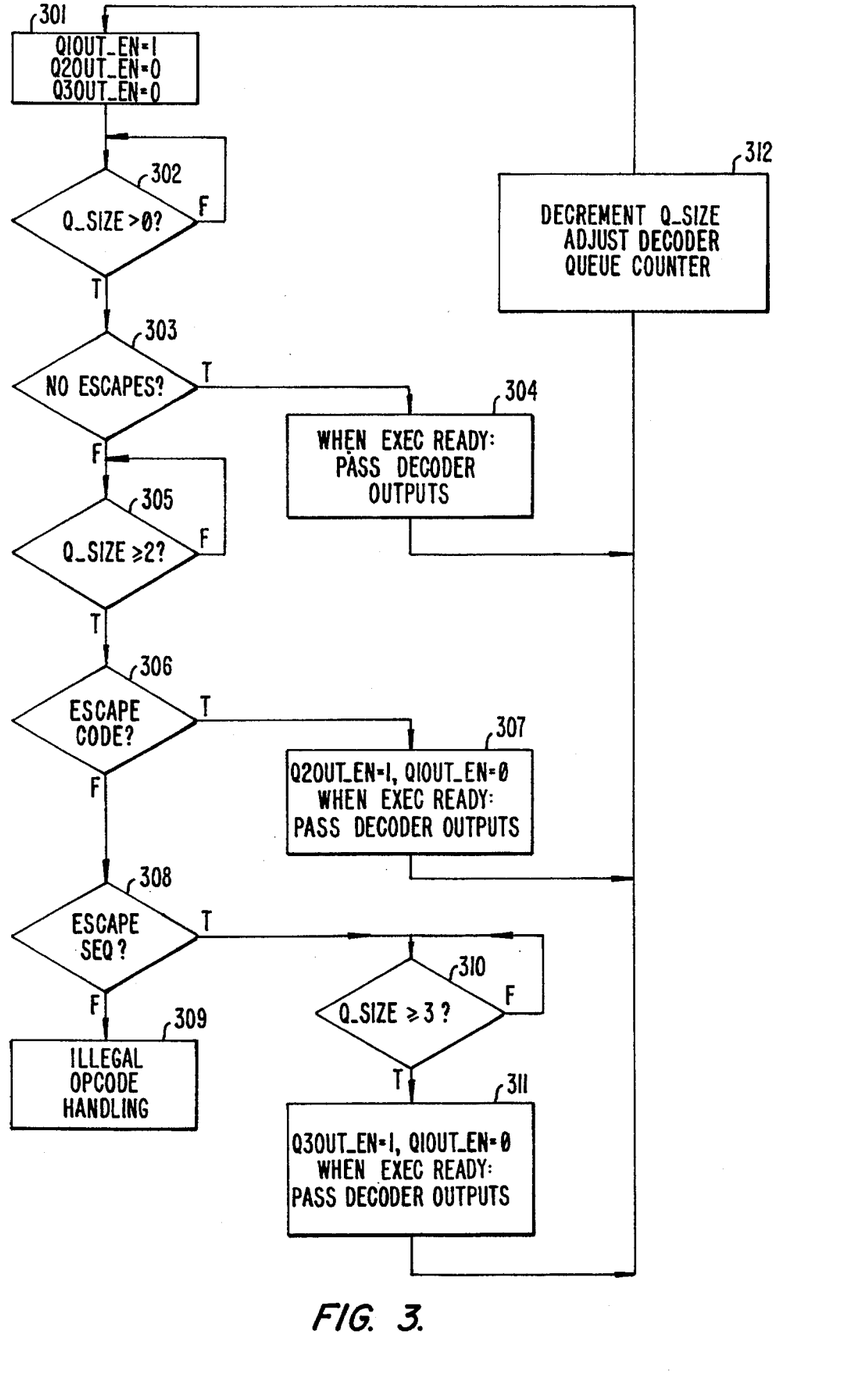
FIG. 3 is a flow chart illustrating the logic in the preferred embodiment for examining segments of an opcode before decoding of the corresponding instruction.

Reference is now made to FIG. 3. In block 301, the Escape Code/Sequence Analyzer 206 initializes Q1out-En to "1", Q2out-en to "0" and Q3out-en to "0". In this way, when the Prefetch Queue 201 is empty and an instruction with an 1-byte opcode enters the CPU 12, that instruction can pass directly into the Instruction Decoder 15 and the first byte will be decoded.

In decision block 302, the value of the Q-size counter 202 is checked to determine whether the Prefetch Queue 201 is empty. If the value of the Q-size counter 202 is zero, the Prefetch Queue 201 is empty and the Escape Code/Sequence Analyzer 206 will loop on block 302 to wait for a byte of instruction to be fetched.

When a byte of instruction is fetched by the CPU 12 and stored into the Prefetch Queue 201, the Q-size counter 202 will be incremented. The Escape Code/Sequence Analyzer 206 will then follow the "yes" path from block 302 to decision block 303.

In decision block 303, a determination is made to see whether the "No Escape" condition of Table 1 is satisfied. If the "No Escape" condition is satisfied, the opcode of the next sequential instruction is 1-byte wide and the Escape Code/Sequence Analyzer 206 will enter block 304.

In block 304, the Escape Code/Sequence Analyzer 206 waits for the Execution Logic 16 to be ready to accept the next sequential instruction. When the Execution Logic 16 is ready, execution of the instruction will commence. Since Q1out-en was initialized, the first byte in the Prefetch Queue 201 will be gated to the Instruction Decoder 15.

After the opcode is decoded by the Instruction Decoder 15, the length of the instruction will be known. In Block 312, the Q-size counter 202 is decremented by the number of bytes equal to the length of the whole instruction (including all opcode and constant, if any, fields). The Decoder Queue Counter 208 is also adjusted so that it now points to the start of the subsequent instruction, which becomes the next sequential instruction.

The Escape Code/Sequence Analyzer 206 enters block 305 from block 303 when the "No Escape" condition is not met. That means that the first byte of the next sequential instruction is an escape code. Since the opcode has at least two bytes, the Escape Code/Sequence Analyzer 206 in block 305 therefore waits for the Q-size counter 202 to be incremented to a value of two or higher.

When the Q-size counter 202 is greater or equal to 2, the Escape Code/Sequence Analyzer 206 will enter decision block 306. In decision block 306, Escape Code/Sequence Analyzer 206 checks whether any one of the three conditions of "Escape Code" is met. If one of these three conditions is met, the next sequential instruction would have a 2-byte opcode. The Escape Code/Sequence Analyzer 206 then enters block 307.

In block 307, the Escape Code/Sequence Analyzer 206 sets Q2out-en and resets Q1out-en. When the Execution Logic 16 is ready to accept the next sequential instruction, execution commences. Since Q2out-en is set, the second byte of from the Prefetch Queue 201 will therefore be gated to the Instruction Decoder 15. After the instruction is sent to the Instruction Decoder 15, Block 312 will be entered. In Block 312, the Q-size counter 202 is decremented by the number of bytes equal to the length of the whole instruction (including opcode and constant, if any, fields). The Decoder Queue Counter 208 is also adjusted to point to the start of the next instruction.

If the none of the "Escape Code" conditions set forth in Table 1 is met, the Escape Code/Sequence Analyzer 206 will enter decision block 308. In block 308, it checks for the two conditions of "Escape Sequence" as set forth in Table 1. If none of these two conditions is met, it will enter block 309 where it will cause, through the Esc-inf lines, the computer 100 to execute a procedure for handling illegal opcode.

If one of the two "Escape Sequence" conditions is met, the opcode of the next sequential instruction would have three bytes. The Escape Code/Sequence Analyzer 206 then enters block 310. In Block 310, the Escape Code/Sequence Analyzer 206 waits for the Q-size counter 202 to become greater or equal to 3 (i.e. it waits for the Prefetch Queue 201 to have at least 3 bytes).

When the value of the Q-size Counter 202 is greater or equal to 3, the Escape Code/Sequence Analyzer 206 will enter block 311. In block 311, the Escape Code/Sequence Analyzer 206 sets Q3out-en and resets Q1out-en.

When the Execution Logic 16 is ready to accept the next sequential instruction, execution will commence. Since Q3out-en is set, the third byte from the next sequential instruction will be gated into the Instruction Decoder 15. Upon decoding the opcode, the Instruction Decoder 15 will know the length of the decoder instruction. In block 312, the Q-size counter 202 is decremented by the number of bytes equal to the length of the whole instruction (including all opcode and constant, any, fields). The Decoder Queue Counter 208 is also adjusted so that it now points to the start of the next instruction.

In summary, when it is time for an instruction to be decoded, the escape code(s) of a multi-byte opcode instruction will be bypassed and only the relevant opcode byte will be decoded. Decoding the instruction thus takes only one CPU clock cycle even if it has a multi-byte opcode, and processing of an instruction is accelerated.

There are several ways in which each of the Prefetch Queue 201 and the Escape Queue 204 can be implemented. One way is to use a wrap around buffer. Another way is to use shift-registers.

Figure 4:
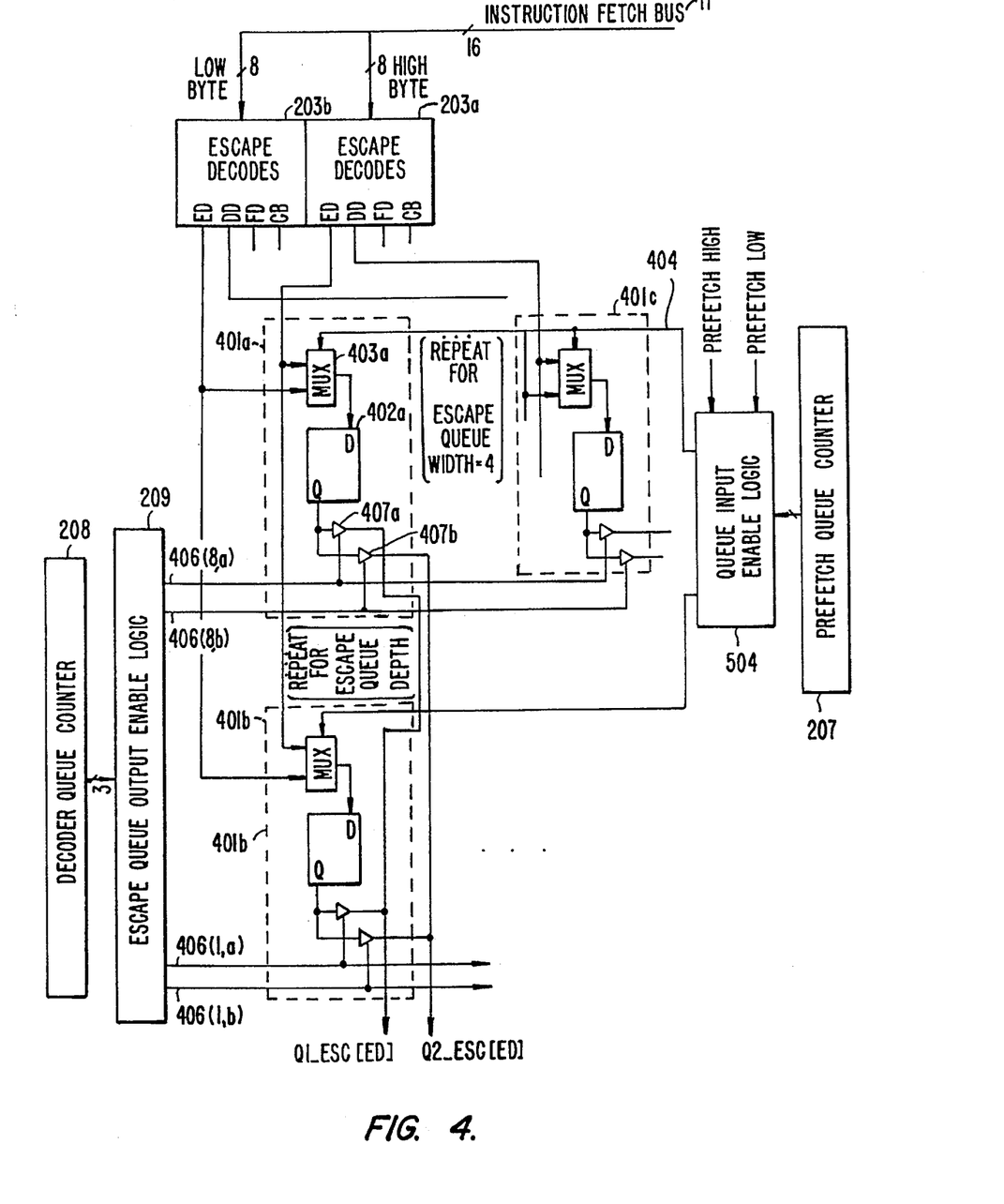
FIG. 4 is a schematic block diagram illustrating an implementation of the Escape Queue of the preferred embodiment.

FIG. 4 is a schematic diagram which illustrates the implementation of the Escape Queue 204 in the preferred embodiment.

The Escape Queue 204 in the preferred embodiment is a 4-bit wide queue with a depth of eight entries. It is implemented with an matrix of eight rows with four cells per row. Each row of cells is used for storing the four output bits from either the high order Escape Decoder 203a or the low order Escape Decoder 203b.

Each cell 401 has a D-type flip-flop 402 whose input is connected to the output of a multiplexor 403. Each multiplexor 403 has two inputs. One input is connected to a bit output from the high order Escape Decoder 203a and the other input is connected to the corresponding bit output from the low order Escape Decoder 203b. For example, the multiplexor 403a has one input connected to the ED bit output of low order decoder 203b and another input connected to the ED bit output of the high order decoder 203a.

The select input 404 of each multiplexor 403 is controlled by the Queue Input Enable Logic 504. The Queue Input Enable Logic 504 is coupled to receive the Prefetch Queue counter 207 which points to the respective first vacant entries of both the Prefetch Queue 201 and the Escape Queue 204. The Queue Input Enable Logic 504, by decoding the Prefetch Queue Counter 207, operates to select the row of cells in the matrix that constitutes the first vacant entry of the Escape Queue 204. This row is selected for storing the output of either the high order or the low order Escape Decoders 203a, 203b.

The outputs of the Escape Queue 204 are controlled by an Escape Queue output Enable Logic 209. The Escape Queue Output Enable Logic 209 is coupled to the Decoder Queue Counter 208 which points to the respective entries in both the Escape Queue 204 and the Prefetch Queue 201 that correspond to the beginning of the next sequential instruction.

The Escape Queue Output Enable Logic 209 decodes the value of the Decoder Queue Counter 208 to activate two of sixteen output signals 406(1,a), 406(1,b), . . . 406(8,a), 406(8,b). The sixteen signals are organized into eight pairs with each pair, such as 406(8,a) and 406(8,b), being coupled via two tri-state gates, such as 407a and 407b, to the outputs from a row of cells of the Escape Queue 204 as shown in FIG. 2.

At any one time, the Escape Queue Output Enable Logic 209 would, based upon the value of the Decoder Queue Counter 208, activate the upper one, 406(i,a), of one of its eight pairs of outputs to gate the queue entry that corresponds to the next sequential instruction. The output from this entry is the Q1-Esc signal. At the same time, the Escape Queue Output Enable Logic would also activate the lower one, 406(i+1, a), of the next pair of outputs to gate the next entry. The output from this next entry is the Q2-Esc signal.

Figure 5:
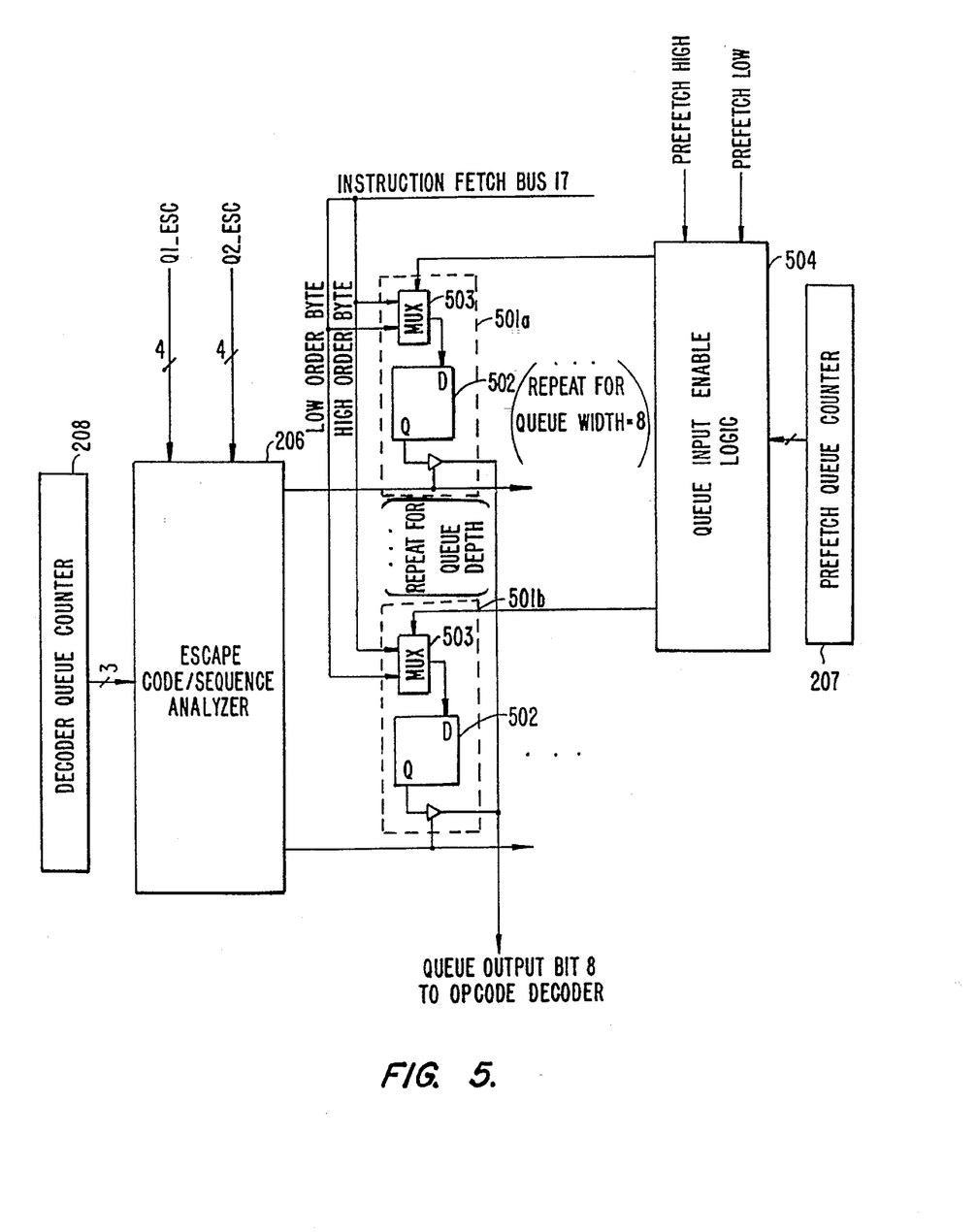
FIG. 5 is a schematic block diagram illustrating an implementation of the Prefetch Queue of the preferred embodiment.

FIG. 5 is a schematic diagram which illustrates an implementation of the Prefetch Queue 201.

The Prefetch Queue 201 is implemented in a similar manner as the Escape Queue 204. Similar to the Escape Queue 204, the Prefetch Queue 201 is implemented with a matrix, although the matrix has with eight rows by eight columns of cells.

Each cell 501 has a D-type flop-flop 502 whose input is connected to a multiplexor 503. Each multiplexor 503 has two inputs. One input is connected to a bit output from the high order byte of the Instruction Fetch Bus 17 and the other input is connected to the corresponding bit output from the low order byte of the Instruction Fetch Bus 17.

The select input of each multiplexor 503 is controlled by the Queue Input Enable Logic 504, which is coupled to receive the Prefetch Queue Counter 207. The Queue Input Enable Logic 504, by decoding the Prefetch Queue Counter 207, operates to select the row of cells in the matrix that constitutes the first vacant entry of the Prefetch Queue 201. This row is selected for storing the output of either the high order or the low order Instruction Fetch Bus 17.

The outputs of the Prefetch Queue 201 are controlled by the Escape Code/Sequence Analyzer 206. The Escape Code/Sequence Analyzer 206 receives the outputs from the 3-bit Decoder Queue Counter 208 which points to respective entries of the Escape Queue 204 and Prefetch Queue 201 that correspond to the beginning of the next sequential instruction. It also receives the Q1esc and Q2-esc outputs from the Escape Queue 204. From these signals the Escape Code/Sequence Analyzer 206 operates to activate one of its three output signals, Q1out-en, Q2out-en and Q3out-en, to select the appropriate byte from the beginning of the next sequential instruction into the Instruction Decoder 15.

The invention has been illustrated above in reference to particular implementations and specific components, such as the width of the bus 13, the depth of the queues, etc. It will be understood, however, that the implementation and the process may be varied and modified without departing from the invention whose scope is to be limited only by the appended claims.

What is claimed is:

1. A central processing unit (CPU), comprising:

fetching means for fetching CPU instructions, decoding means for decoding CPU instructions fetched by said fetching means, executing means for executing CPU instructions decoded by said decoding means, and examining means for examining, concurrently with the fetching of a CPU instruction by said fetching means, a first subset of bits in the CPU instruction, including means for generating at least one signal based upon said first subset of bits to accelerate decoding of the CPU instruction by the decoding means, wherein said examining means further comprises means responsive to said at least one signal for selecting a second subset of bits in said CPU instruction to be decoded by said decoding means.

2. A CPU as in claim 1, wherein said fetching means includes a first queuing means for storing CPU instructions and said examining means includes a second queuing means for storing said at least one signal.

3. A CPU as in claim 2, wherein said first queuing means and said second queuing means have an equal number of entries.

4. A CPU as in claim 3, wherein said examining means comprises a decoder.

5. A CPU as in claim 3, wherein said fetching means, said decoding means and said executing means are organized into a pipeline architecture.

6. A CPU as in claim 1, wherein:

said decoding means operates to decode m bits or a CPU instruction word having a n-bit opcode, m being at least as small as n, and wherein said examining means operates to examine said first subset of bits in said n-bit opcode of said CPU instruction word to identify m bits in said opcode to be decoded by said decoding means.

7. A CPU as in claim 2, wherein said first queuing means also functions to latch said CPU instructions, and wherein said second queuing means also functions to latch said at least one signal.

8. A CPU as in claim 7, wherein said first queuing means and said second queuing means have an equal number of entries.

9. A CPU as in claim 8, wherein said examining means comprises a decoder.

10. A CPU as in claim 8, wherein said fetching means, said decoding means and said executing means are organized into a pipeline architecture.

11. A central processing unit (CPU) which processes CPU instructions with opcodes of different lengths, the CPU comprising:

fetching means for fetching CPU instructions in segments, including a means for assembling said segments into CPU instructions, decoding means for decoding CPU instructions assembled in said fetching means, executing means for executing CPU instructions decoded by said decoding means, and wherein said fetching means includes an examining means for examining, before a CPU instruction is decoded by said decoding means, at least a first subset of bits of said CPU instruction, and includes means for generating at least one signal to accelerate decoding of said CPU instruction by said decoding means, wherein each of said CPU instructions includes a second subset of bits containing information for controlling said executing means, and wherein said examining means comprises means in response to said at least one signal for identifying said second subset of bits of said CPU instruction to be decoded by said decoding means.

12. A CPU as in claim 11, wherein said first subset of bits form an escape code for expanding a CPU instruction opcode.

13. A CPU as in claim 11, wherein said fetching means includes a first queuing means for latching segments of CPU instructions fetched and said examining means includes a second queuing means for latching said at least one signal.

14. A CPU as in claim 13, wherein said first queuing means and said second queuing means have an equal number of entries.

15. A CPU as in claim 14, wherein said examining means comprises a decoder.

16. A CPU as in claim 14, wherein said fetching means, said decoding means and said executing means are organized into a pipeline architecture.

17. A method for improving throughput in a pipeline central processing unit (CPU), said CPU having means for fetching CPU instructions from memory, a decoder for decoding fetched CPU instructions and means for executing CPU instructions in response to results from said decoder, the method comprising the steps of:

examining a first subset of bits in an opcode of a CPU instruction concurrently with fetching of the corresponding CPU instruction, generating at least one signal based upon said first subset of bits, and accelerating decoding of said CPU instruction using said at least one signal, wherein said accelerating step comprises the step of selecting a second subset of bits of said CPU instruction to be decoded by said decoder based upon said first subset of bits of said CPU instruction.

18. A method as in claim 17, wherein said examining step comprises the step of identifying whether said first subset of bits is equivalent to a predetermined value.

19. A method as in claim 18, wherein said identifying step comprises the step of decoding said first subset of bits.

20. In a central processing unit (CPU) having a fetching means for fetching CPU instructions, a decoding means for decoding CPU instructions fetched by the fetching means, an executing means for executing CPU instructions decoded by the decoding means, wherein each of said CPU instructions includes a subset of escape bits and a subset of control bits containing information for controlling said executing means, a means for accelerating decoding of the CPU instructions comprising:

means for examining, concurrently with fetching of a new CPU instruction by said fetching means, said subset of escape bits in the new CPU instruction, means for generating at least one signal based upon said subset of escape bits, and means in response to said at least one signal for identifying the subset of control bits of the new CPU instruction to be decoded by the decoding means.

21. A CPU as in claim 20, wherein said subset of escape bits form an escape code for expanding a CPU instruction opcode.

22. A CPU as in claim 20, including a first queuing means for queuing CPU instructions fetched and second queuing means for queuing said at least one signal.

23. A CPU as in claim 22, wherein said first queuing means and said second queuing means have an equal number of entries.

24. A CPU as in claim 23, wherein said examining means comprises a decoder.

25. The method of claim 17 wherein said accelerating step includes the step of passing only a portion of a CPU instruction word to the decoder, and not passing the entire CPU instruction word to the decoder.

26. The method of claim 17 wherein said examining step includes the step of inspecting each byte of an n-byte CPU instruction word for escape codes.

27. In a pipeline central processing unit (CPU) having means for fetching a multiple-byte CPU instruction word from memory, a decoder for decoding said CPU instruction word and means for executing said CPU instruction word in response to results from said decoder, said CPU instruction word being n bytes in length wherein a first n-1 bytes are escape codes, a method for improving throughput in a pipeline central processing unit comprising the steps of:

accelerating decoding of said CPU instruction word, said accelerating step including the steps of:

passing only an nth byte of said n-byte CPU instruction word to the decoder and not passing said first n-1 bytes of said CPU instruction word to the decoder, and simultaneously providing at least one signal to the decoder to inform the decoder how to properly interpret said nth byte.

28. The method of claim 27 further including the step of inspecting each byte of an n-byte CPU instruction word for escape codes.

29. The CPU of claim 20 wherein said accelerating means further comprises means for passing said subset of control bits of the new CPU instruction to the decoder and for not passing said subset of escape bits to the decoder.

30. The CPU of claim 1 further comprising means for passing only said second subset of bits to said decoding means, and for not passing said first subset of bits to said decoding means.

31. The CPU of claim 11 further comprising means for passing only a portion of a fetched CPU instruction word to said decoding means, and for not passing all of said fetched CPU instruction word to said decoding means.

* * * * *

UNITED STATES PATENT AND TRADEMARK OFFICE
CERTIFICATE OF CORRECTION

PATENT NO. : 5,592,635
DATED : January 7, 1997
INVENTOR(S) : Stephen H. Chan

It is certified that error appears in the above-indentified patent and that said Letters Patent is hereby corrected as shown below:

Column 9, line 12, Claim 6:
replace "said decoding means operates to decode m bits or a CPU" with:

--said decoding means operates to decode m bits of a CPU--

Column 10, line 46, Claim 22:
replace "for queuing CPU instructions fetched and second queuing" with:

--for queuing CPU instructions fetched and a second queuing--

Signed and Sealed this

Twenty-third Day of December, 1997

Attest:

BRUCE LEHMAN

*Attesting Officer*   *Commissioner of Patents and Trademarks*